(12) United States Patent
Lee

(10) Patent No.: US 8,502,891 B2
(45) Date of Patent: Aug. 6, 2013

(54) METHOD AND APPARATUS FOR REALIZING DYNAMIC IMAGE EFFECT

(75) Inventor: Seung-yun Lee, Hwaseong-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 260 days.

(21) Appl. No.: 12/910,981

(22) Filed: Oct. 25, 2010

(65) Prior Publication Data
US 2011/0096202 A1 Apr. 28, 2011

(30) Foreign Application Priority Data
Oct. 26, 2009 (KR) .................. 10-2009-0101728

(51) Int. Cl.
*H04N 5/262* (2006.01)
(52) U.S. Cl.
USPC ....................... 348/239; 348/222.1

(58) Field of Classification Search
USPC ............................ 348/222.01, 239
See application file for complete search history.

(56) References Cited

U.S. PATENT DOCUMENTS

| 2008/0246778 A1* | 10/2008 | Ham et al. ........ 345/646 |
| 2010/0053355 A1* | 3/2010 | Iwase et al. ........ 348/222.1 |
| 2010/0079388 A1* | 4/2010 | Ohnishi et al. ........ 345/173 |

* cited by examiner

*Primary Examiner* — Gevell Selby
(74) *Attorney, Agent, or Firm* — Drinker Biddle & Reath LLP

(57) ABSTRACT

A method and apparatus for realizing a dynamic image effect by which a user can have fun by setting a moving direction and speed of an object (e.g., snow, flowers and autumn leaves) and displaying the object together with an image. The apparatus for realizing the dynamic image effect includes a digital image processing apparatus, and includes a digital signal processor (DSP) for adjusting direction and speed of the object displayed together with the image.

14 Claims, 12 Drawing Sheets

METHOD AND APPARATUS FOR REALIZING DYNAMIC IMAGE EFFECT

CROSS-REFERENCE TO RELATED PATENT APPLICATION

This application claims the priority benefit of Korean Patent Application No. 10-2009-0101728, filed on Oct. 26, 2009, in the Korean Intellectual Property Office, the disclosure of which is incorporated herein in its entirety by reference.

BACKGROUND

1. Field of the Invention

Embodiments relate to a method and apparatus for realizing a dynamic image effect, and more particularly, to a method and apparatus for realizing a dynamic image effect by which an object (e.g., snow, flowers and autumn leaves) is displayed together with an image.

2. Description of the Related Art

By virtue of the development in digital image processing apparatuses, digital image processing apparatuses having various functions have been introduced for satisfying user requirements. As shown in FIG. 13, a digital image processing apparatus realizes an effect by which falling snow is displayed on an image, thereby making the digital image processing apparatus fun to use.

SUMMARY

Embodiments include a method and apparatus for realizing a dynamic image effect by which a user may have fun by setting a moving direction and speed of an object and displaying the object together with an image.

According to an embodiment, an apparatus for realizing a dynamic image effect includes a digital image processing apparatus having a digital signal processor (DSP) that adjusts a moving direction and a moving speed of a predetermined object displayed together with an image.

The DSP may include an object type setting unit that provides an object type and sets the predetermined object; a direction setting unit that sets a direction of the predetermined object; a speed setting unit that sets a speed of the predetermined object; and a controller that displays the predetermined object together with an image according to the direction and the speed.

The direction setting unit may detect a touch on a display unit on which the image is displayed.

The direction setting unit may include a sensor that detects a grip direction of the digital image processing apparatus, and the direction setting unit may detect the grip direction of the digital image processing apparatus by using the sensor.

The apparatus may further include a face detector that detects a face direction from the image, and the direction setting unit may set the direction of the predetermined object to be opposite to the face direction.

The speed setting unit may set the speed of the predetermined object by adjusting a shutter speed of the digital image processing apparatus.

According to another embodiment, an apparatus for realizing a dynamic image effect includes a digital image processing apparatus; an object setting unit that provides at least one object to be displayed together with an image and sets a predetermined object from among the at least one object; a touch detector that detects a touch on a display unit on which the image is displayed; a shutter speed setting unit that sets a shutter speed of the digital image processing apparatus; and a controller that calculates a direction of the predetermined object according to the detected touch, calculates a moving speed of the predetermined object according to the shutter speed, and displays the predetermined object together with the image.

According to another embodiment, an apparatus for realizing a dynamic image effect includes: a digital image processing apparatus; an object setting unit that provides at least one object displayed together with an image and sets a predetermined object from among the at least one object; a sensor that detects a grip direction of the digital image processing apparatus; a shutter speed setting unit that sets a shutter speed of the digital image processing apparatus; and a controller that calculates a direction of the predetermined object according to the detection result of the sensor, calculates a moving speed of the predetermined object according to the shutter speed, and displays the predetermined object together with the image.

According to another embodiment, an apparatus for realizing a dynamic image effect includes: a digital image processing apparatus; an object setting unit that provides at least one object to be displayed together with an image and sets a predetermined object from among the at least one object; a face detector that detects a face direction of a subject from an image; a shutter speed setting unit that sets a shutter speed of the digital image processing apparatus; and a controller that calculates a direction of the predetermined object so as to be opposite to the face direction, calculates a moving speed of the predetermined object according to the shutter speed, and displays the predetermined object together with the image.

According to another embodiment, a method of realizing a dynamic image effect includes: operating a digital image processing apparatus; providing at least one object to be displayed together with an image and receiving a signal for selecting a predetermined object from among the at least one object; setting a direction of the predetermined object; setting a speed of the predetermined object; and displaying the predetermined object together with the image according to the direction and speed.

The setting of the direction may include detecting a touch on a display unit on which the image is displayed.

The setting of the direction may include detecting a grip direction of the digital image processing apparatus.

The setting of the direction may include setting the direction to be opposite to a face direction detected from the image.

The setting of the speed may include setting the speed according to a shutter speed of the digital image processing apparatus.

According to another embodiment, a method of realizing a dynamic image effect includes: operating a digital image processing apparatus; providing at least one object to be displayed together with an image and receiving a signal for selecting a predetermined object from among the at least one object; detecting a touch on a display unit on which the image is displayed; setting a shutter speed of the digital image processing apparatus; and calculating a direction of the predetermined object according to the detected touch, calculating a moving speed of the predetermined object according to the shutter speed, and displaying the predetermined object together with the image.

According to another embodiment, a method of realizing a dynamic image effect includes operating a digital image processing apparatus; providing at least one object to be displayed together with an image and receiving a signal for selecting a predetermined object from among the at least one object; detecting a grip direction of the digital image processing apparatus, wherein the detecting is performed by a sensor; setting a shutter speed of the digital image processing apparatus; and calculating a direction of the predetermined object according to the detection result of the sensor, calculating a moving speed of the predetermined object according to the shutter speed, and displaying the predetermined object together with the image.

According to another embodiment, a method of realizing a dynamic image effect in a digital image processing apparatus includes: providing at least one object to be displayed together with an image and receiving a signal for selecting a predetermined object from among the at least one object; detecting a face direction of a subject from the image; setting a shutter speed of the digital image processing apparatus; and calculating a direction of the predetermined object so as to be opposite to the face direction, calculating a moving speed of the predetermined object according to the shutter speed, and displaying the predetermined object together with the image.

BRIEF DESCRIPTION OF THE DRAWINGS

The above and other features and advantages will become more apparent by describing in detail exemplary embodiments with reference to the attached drawings in which.

DETAILED DESCRIPTION

Hereinafter, exemplary embodiments will be described in detail with reference to the attached drawings.

Figure 1:
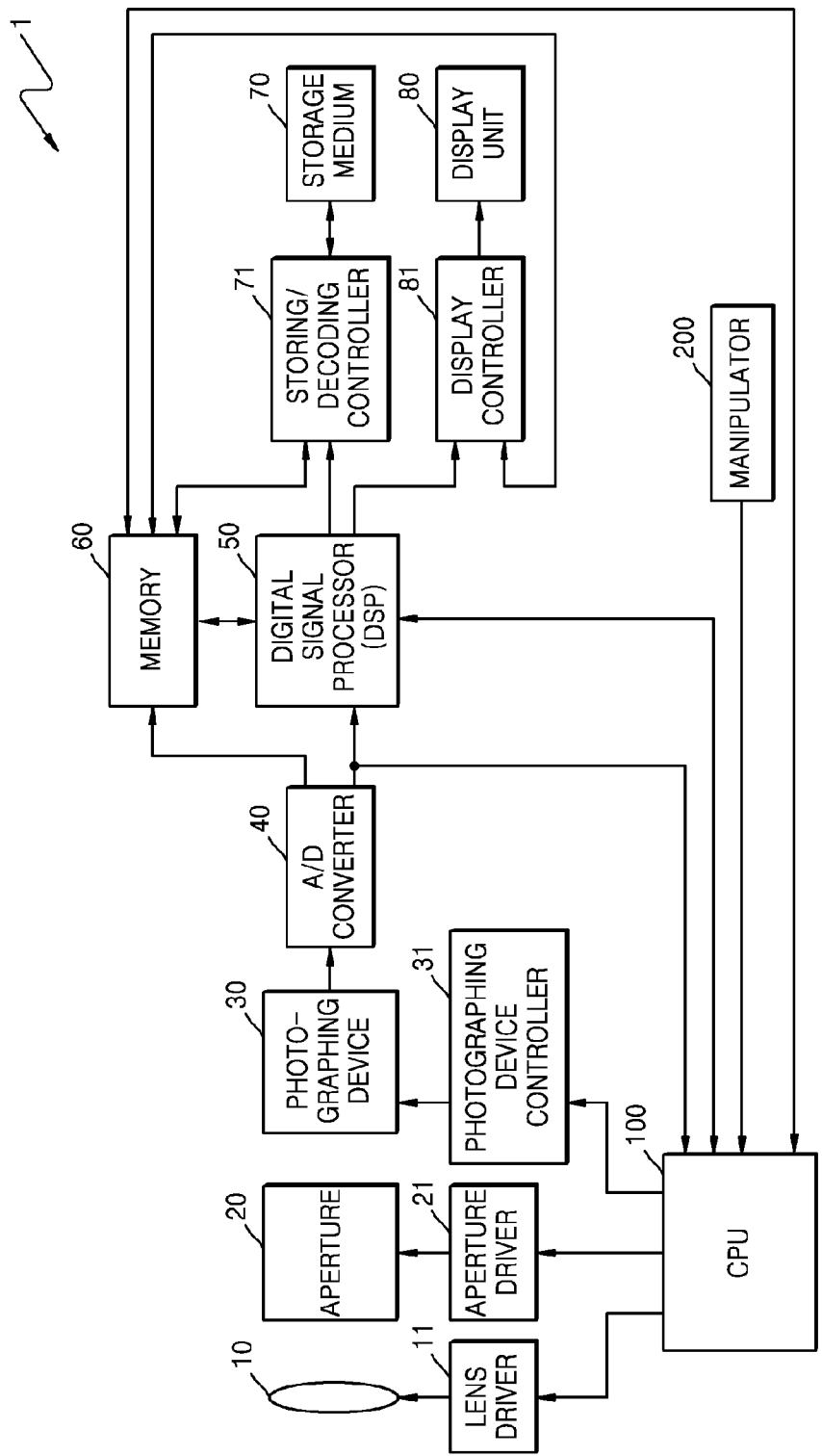
FIG. 1 is a block diagram of an apparatus for realizing a dynamic image effect, according to an embodiment.

FIG. 1 is a block diagram of an apparatus for realizing a dynamic image effect, according to an embodiment. In particular, FIG. 1 schematically shows a digital image processing apparatus 1 for realizing the dynamic image effect (hereinafter, the apparatus for realizing a dynamic image effect will be referred to as the 'digital image processing apparatus'). Embodiments are not limited to being applied to the digital image processing apparatus 1 of FIG. 1, and may be applied to an image processing apparatus such as a personal digital assistant (PDA) and a personal multimedia player (PMP). Likewise, embodiments and modified embodiments that will be described later may be applied to these image processing apparatuses.

An entire operation of the digital image processing apparatus 1 is controlled by a central processing unit (CPU) 100. The digital image processing apparatus 1 includes a manipulator 200 including keys for the user to generate and output an electrical signal. The electrical signal output from the manipulator 200 is transmitted to the CPU 100, and the CPU 100 controls the digital image processing apparatus 1 according to the electrical signal.

In a photographing mode, when the electrical signal output from the manipulator 200 is input to the CPU 100, the CPU 100 analyses the electrical signal so as to control a lens driver 11, an aperture driver 21 and a photographing device controller 31. Thus, a location of a lens 10, a degree of opening of an aperture 20, and sensitivity of a photographing device 30 are controlled. The photographing device 30 generates analog data from light input thereto. An analog/digital (A/D) converter 40 converts analog data output from the photographing device 30 into digital data. The A/D converter 40 may be omitted according to the characteristics of the photographing device 30. In this case, data output from the photographing device 30 may be input to a digital signal processor (DSP) 50 through a memory 60, or alternatively, may be input directly to the DSP 50 without passing through the memory 60. The data may also be input to the CPU 100. The memory 60 may include a read only memory (ROM) or a random access memory (RAM). In some embodiments, the DSP 50 may perform a digital signal process such as gamma correction and white balance correction.

FIGS. 2, 3, 5, and 7 are block diagrams of the digital signal processor (DSP) of FIG. 1, according to various embodiments. As shown in FIGS. 2, 3, 5 and 7, the DSPs 50 may include an object type setting unit 51, a direction setting unit 52 including a touch detector 52-1, a gyro sensor 52-2 and a face detector 52-3, a speed setting unit 53 including a shutter speed setting unit 53-1, and a controller 54. The object type setting unit 51, the direction setting unit 52 including the touch detector 52-1, the gyro sensor 52-2 and the face detector 52-3, the speed setting unit 53 including the shutter speed setting unit 53-1, and the controller 54 may be configured as separate elements instead of elements included in the DSP 50. Likewise, various changes in form and details may be made. Operations of these elements will be described later.

Referring again to FIG. 1, an image of the data output from the DSP 50 may be transmitted to a display controller 81 through the memory 60, or alternatively, may be transmitted directly to the display controller 81. The display controller 81 controls a display unit 80 so as to display the image on the display unit 80. The display unit 80 may include a touch screen. The data output from the DSP 50 may be input to a storing/decoding controller 71 through the memory 60, or alternatively, may be input directly to the storing/decoding controller 71. The storing/decoding controller 71 may store image data in a storage medium 70, automatically, or according to the electrical signal output from the manipulator 200. The storing/decoding controller 71 may decode data from an image file stored in the storage medium 70. Then, the storing/decoding controller 71 may input the data to the display controller 81 through the memory 60 or another path so as to display an image on the display unit 80. The storage medium 70 may be detachable from or permanently installed in the digital image processing apparatus 1.

Hereinafter, a function of the DSP 50 for realizing the dynamic image effect will be described with reference to FIGS. 2 through 9.

Figure 2:
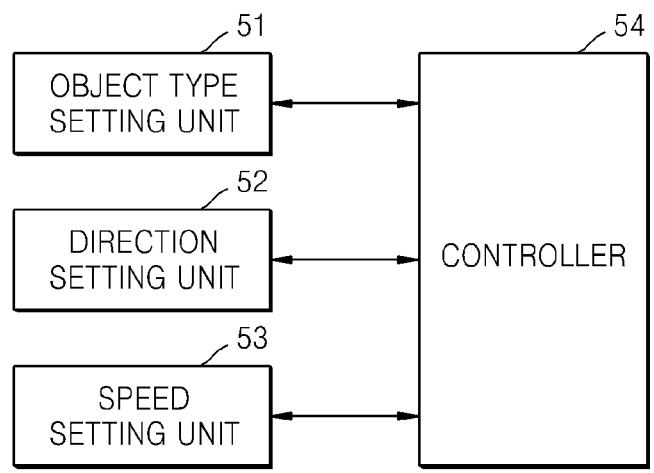
FIG. 2 is a block diagram of the digital signal processor (DSP) of FIG. 1, according to an embodiment.

FIG. 2 is a block diagram of the DSP 50 of FIG. 1, according to an embodiment. Referring to FIG. 2, the DSP 50 adjusts the moving direction and moving speed of an object displayed together with a displayed image. To achieve this, the digital processor 50 includes the object type setting unit 51, the direction setting unit 52, the speed setting unit 53 and the controller 54. According to the present embodiment, the image may be a live view image or a reproduction image.

The object type setting unit 51 may provide an object displayed together with an image, such as flowers, autumn leaves, snow and money, and may receive, from a user, a selection signal for selecting an object from among different objects.

The direction setting unit 52 sets a moving direction of the selected object. The moving direction of the object may be set to be a direction from top to bottom, or may be set to be a diagonal or horizontal direction, according to the user's settings. The direction setting unit 52 may set the moving direction of the object by detecting the user's touch on the display unit 80, by detecting a rotation angle of the digital image processing apparatus 1 with the gyro sensor 52-2, or by detecting a direction (hereinafter, referred to as the 'face direction') toward which a face faces with the face detector 52-3. The direction setting unit 52 will be described in more detail later.

The speed setting unit 53 sets a moving speed of the object. The speed setting unit 53 may set the moving speed of the object by adjusting a shutter speed. For example, when the shutter speed is set to be $\frac{1}{30}$ of a second while the surrounding is bright, the object may move in the image without deviation. The controller 54 applies the object to the image according to the moving direction set by the direction setting unit 52 and the moving speed set by the speed setting unit 53, and outputs the image to the display unit 80.

Figure 3:
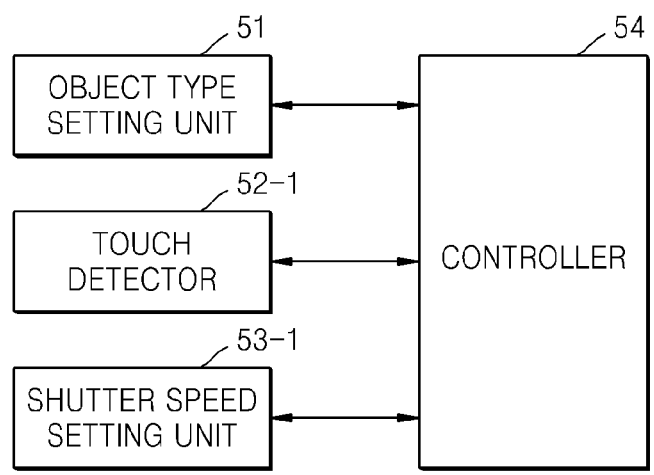
FIG. 3 is a block diagram of the DSP of FIG. 1, according to another embodiment.
Figure 4:
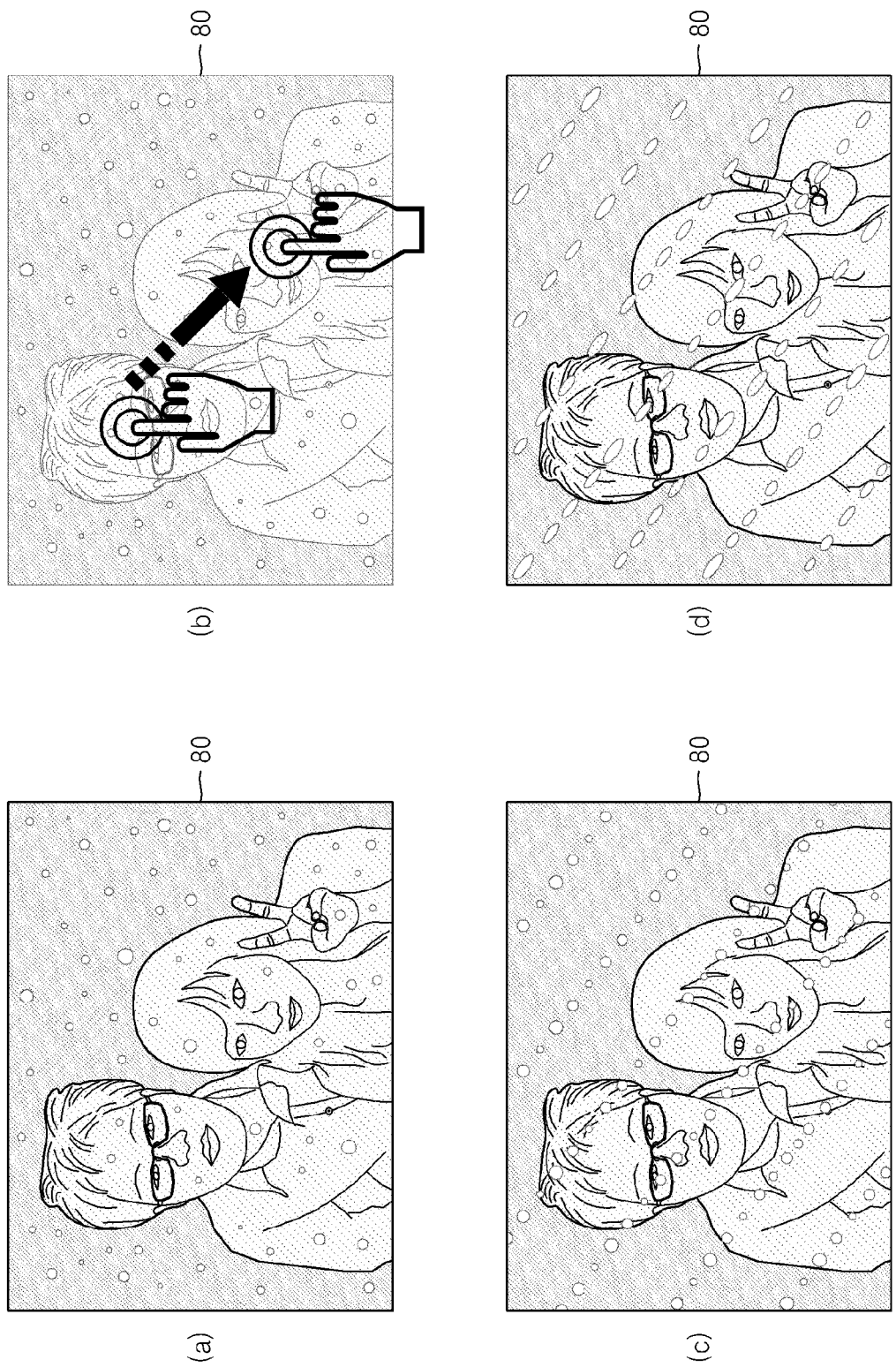
FIGS. 4A through 4D are illustrations for explaining a case where a dynamic image effect is realized by the DSP of FIG. 3, according to an embodiment.

FIG. 3 is a block diagram of the DSP 50 of FIG. 1, according to another embodiment. FIGS. 4A through 4D are illustrations for explaining a case where a dynamic image effect is realized by the DSP 50 of FIG. 3, according to an embodiment. The DSP 50 detects a touch of the display unit 80, and sets a moving direction of an object displayed together with the image. The DSP 50 sets a moving speed of the object so as to display the object displayed together with the image. Then, the DSP 50 displays the object displayed together with the image. To achieve this, the DSP 50 includes the object type setting unit 51, the touch detector 52-1, the shutter speed setting unit 53-1 and the controller 54.

The object type setting unit 51 may provide an object displayed together with the image, such as flowers, autumn leaves, snow and money, and may receive, from a user, a selection signal for selecting an object from among different objects. Hereinafter, an example in which the object type setting unit 51 selects snow as the object is described. When snow is selected as the object, snow that falls randomly is displayed on the image, as shown in FIG. 4A.

The touch detector 52-1 detects a touch input by a user in order to set the moving direction of the snow. FIG. 4B shows a case where the user touches the display unit 80 diagonally from top left to bottom right. The touch detector 52-1 detects coordinates of a portion touched by the user. A moving direction of snow is set according to a detection result of the touch detector 52-1. FIG. 4C shows a case where the moving direction of the snow is set to be one direction according to a detection result of the touch detector 52-1. It can be seen in FIG. 4C that the moving direction of snow is changed to a direction in which the user touches the display unit 80, compared to that of FIG. 4A.

The shutter speed setting unit 53-1 is used to set a moving speed of snow. Generally, when the shutter speed is set to be $\frac{1}{30}$ of a second while the surrounding is bright, the object may move in the image without deviation. FIG. 4D shows a case where the shutter speed is longer than $\frac{1}{30}$ of a second so that snow that blows fast is displayed on the image.

The controller 54 puts snow into the image according to the moving direction set by the touch detector 52-1 and the moving speed set by the shutter speed setting unit 53-1, and outputs the snow onto the display unit 80. FIGS. 4C and 4D show examples of the image that is finally displayed on the display unit 80.

Figure 5:
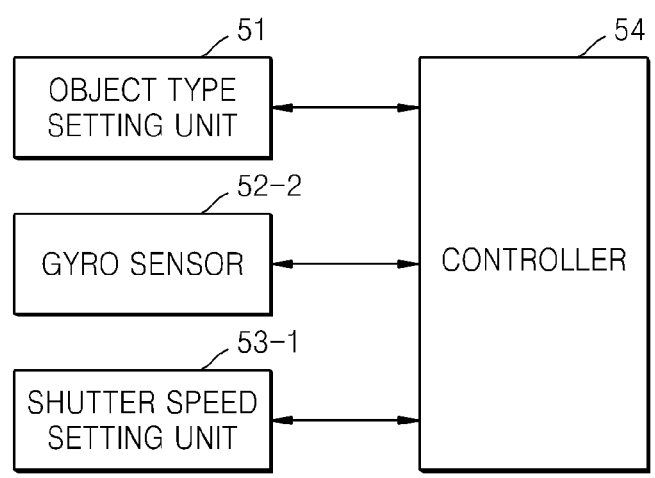
FIG. 5 is a block diagram of the DSP of FIG. 1, according to another embodiment.
Figure 6:
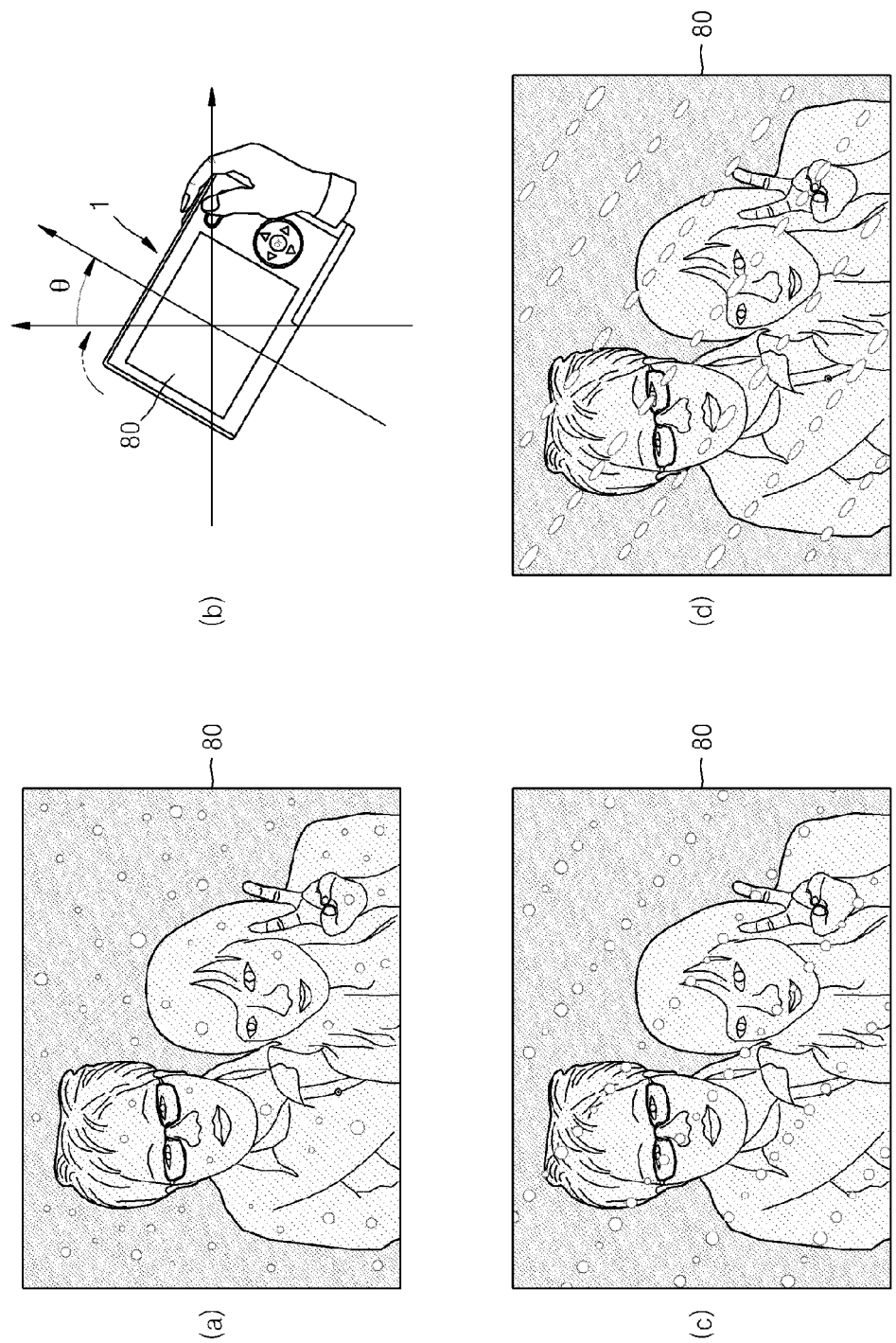
FIGS. 6A through 6D are illustrations for explaining a case where a dynamic image effect is realized by the DSP of FIG. 5, according to another embodiment.

FIG. 5 is a block diagram of the DSP 50 of FIG. 1, according to another embodiment. FIGS. 6A through 6D are illustrations for explaining a case where a dynamic image effect is realized by the DSP 50 of FIG. 5, according to another embodiment. The DSP 50 sets a moving direction of an object displayed together with an image according to a grip direction of the digital image processing apparatus 1, and sets a moving speed of the object by adjusting a shutter speed. Then, the DSP 50 displays the object together with the image. To achieve this, the DSP 50 includes the object type setting unit 51, the gyro sensor 52-2, the shutter speed setting unit 53-1 and the controller 54.

The object type setting unit 51 may provide an object displayed together with an image, such as flowers, autumn leaves, snow and money, and may receive, from a user, a selection signal for selecting an object from among different objects. Hereinafter, an example in which the object type setting unit 51 selects snow as the object is described. When snow is selected as the object, snow that falls randomly is displayed on the image, as shown in FIG. 6A.

The gyro sensor 52-2 detects the grip direction of the digital image processing apparatus 1 held by a user in order to set the moving direction of snow. The gyro sensor 52-2 detects a rotation angle of the digital image processing apparatus 1 when a user holds the digital image processing apparatus 1, and may include a gravity sensor (not shown). A reference angle (e.g., 0°) is stored in the DSP 50 so that the gyro sensor 52-2 detects a rotation angle of the digital image processing apparatus 1. FIG. 6B shows a rotation angle θ of the digital image processing apparatus 1. The gyro sensor 52-2 detects the rotation angle θ of the digital image processing apparatus 1, and then snow moves in the image in a grip direction at the rotation angle θ with respect to the reference angle. FIG. 6C shows a case where the gyro sensor 52-2 detects the rotation angle θ of digital image processing apparatus 1 so as to set the moving direction of snow to one direction. It can be seen in FIG. 6C that the moving direction of snow is changed to a grip direction at the rotation angle θ with respect to the reference angle, compared to that of FIG. 6A.

The shutter speed setting unit 53-1 is used to set a moving speed of snow. Generally, when the shutter speed is set to be $\frac{1}{30}$ of a second while the surrounding is bright, the object may move in the image without deviation. FIG. 6D shows a case where the shutter speed is longer than $\frac{1}{30}$ of a second so that snow blows fast in the image.

The controller 54 applies the object to the image according to the moving direction set by the gyro sensor 52-2 and the moving speed set by the shutter speed setting unit 53-1, and outputs the image to the display unit 80. FIGS. 6C and 6D show examples of the image that is finally displayed on the display unit 80.

Figure 7:
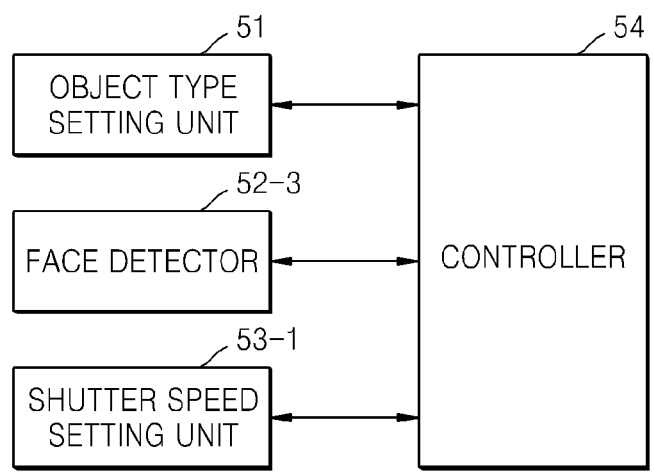
FIG. 7 is a block diagram of the DSP of FIG. 1, according to another embodiment.
Figure 8:
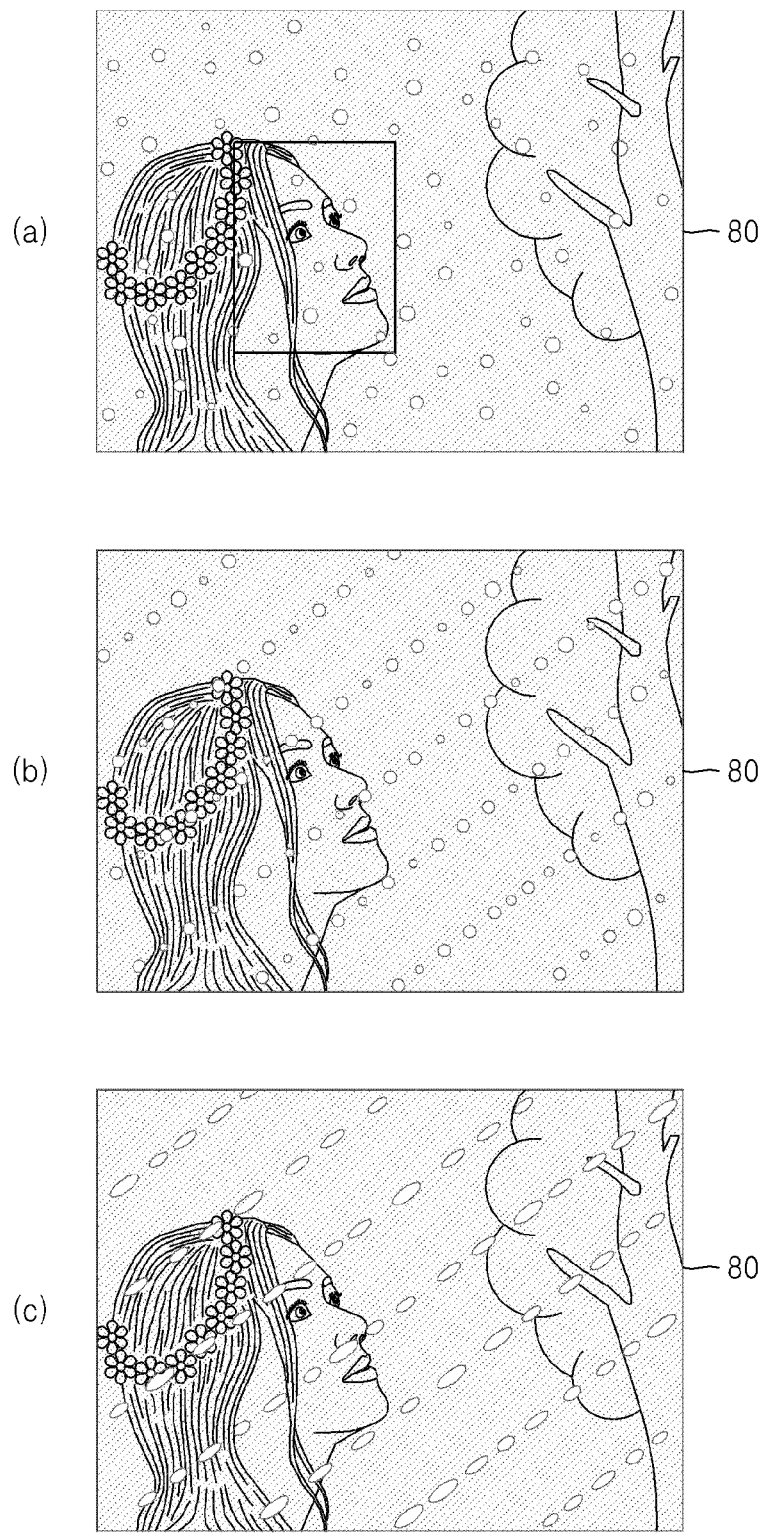
FIGS. 8A though 8C are illustrations for explaining a case where a dynamic image effect is realized by the DSP of FIG. 7, according to another embodiment.

FIG. 7 is a block diagram of the DSP 50 of FIG. 1, according to another embodiment. FIGS. 8A though 8C are illustrations for explaining a case where a dynamic image effect is realized by the DSP 50 of FIG. 7, according to another embodiment. The DSP 50 sets a moving direction of an object displayed together with an image as an opposite direction to the face direction, and sets a moving speed of the object by adjusting a shutter speed. Then, the DSP 50 displays the object together with the image. To achieve this, the DSP 50 includes the object type setting unit 51, the face detector 52-3, the shutter speed setting unit 53-1 and the controller 54.

The object type setting unit 51 may provide an object displayed together with an image, such as flowers, autumn leaves, snow and money, and may receive, from a user, a selection signal for selecting an object from among different objects. Hereinafter, an example in which the object type setting unit 51 selects snow as the object is described. When snow is selected as the object, snow that falls randomly is displayed on the image, as shown in FIG. 8A.

The face detector 52-3 detects the face direction from an image, in order to set the moving direction of snow. The face detector 52-3 detects a face from a displayed image, and detects the face direction. For example, the face direction may be detected by comparing a face detected from the image with learned data regarding the face direction. Many methods of detecting a face and a face direction are well known in the art, and thus the methods will not be described. FIG. 8A shows a case where the face direction is detected from the image. The moving direction of snow displayed on the display unit 80 is set to be opposite to the face direction. FIG. 8B shows a case where snow moves in an opposite direction to the detected face direction.

The shutter speed setting unit 53-1 is used to set a moving speed of snow. Generally, when the shutter speed is set to be $1/30$ of a second while the surrounding is bright, the object may move in the image without deviation. FIG. 8C shows a case where the shutter speed is longer than $1/30$ of a second so that snow that blows fast is displayed on the image.

The controller 54 applies the object to the image according to the moving direction set to be opposite to the face direction detected by the face detector 52-3, and the moving speed set by the shutter speed setting unit 53-1, and outputs the image to the display unit 80. FIGS. 8B and 8C show examples of the image that is finally displayed on the display unit 80.

FIGS. 9, 10, 11, and 12 are flowcharts of methods of realizing a dynamic image effect, according to various embodiments. Hereinafter, methods of realizing the dynamic image effect will be described with reference to FIGS. 9 through 12. According to an embodiment, the methods may be performed in the digital image processing apparatus 1 of FIG. 1. In some embodiments, a main algorithm of the methods may be performed in the DSP 50 with peripheral elements included in the DSP 50.

Figure 9:
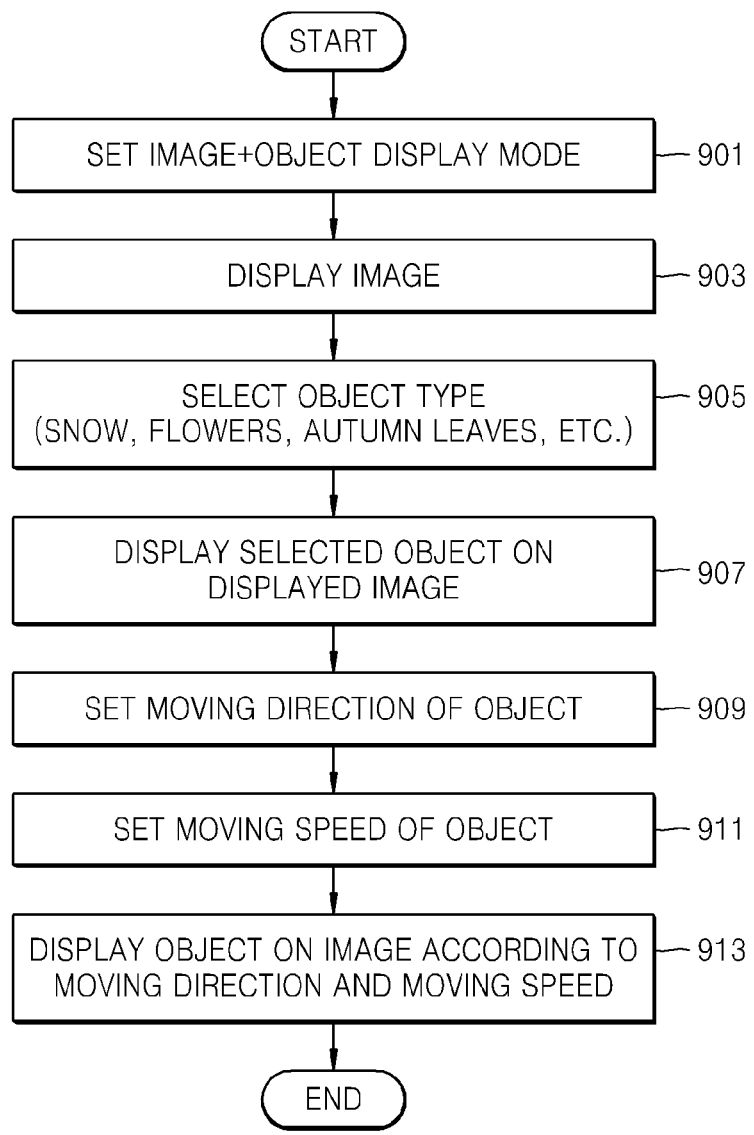
FIG. 9 is a flowchart of a method of realizing a dynamic image effect, according to an embodiment.

The method of realizing a dynamic image effect, according to an embodiment, will be described with reference to FIGS. 1 and 9.

The DSP 50 sets an image and object display mode according to a user's selection (operation 901).

When the image and object display mode are set, the DSP 50 displays an image on the display unit 80 (operation 903). According to the present embodiment, the image may be a live view image or a reproduction image.

Then, the DSP 50 provides an object to be displayed together with an image, such as snow, flowers and autumn leaves, and receives a selection signal for selecting an object type from a user (operation 905).

When the object type is selected, the DSP 50 displays the selected object on the image that is being displayed (operation 907). Initially, the object is set and displayed to have a default moving direction and a default moving speed. For example, the object may be snow, a moving direction of the snow may be from top to bottom, and a moving speed may be $1/30$ of a second of a shutter speed.

The DSP 50 sets a moving direction of the object according to a user's setting signal (operation 909). The DSP 50 may set the moving direction of the object by detecting the user's touch on the display unit 80, by detecting a rotation angle of the digital image processing apparatus 1, or by detecting the face direction from the image.

When the moving direction of the object is completely set, the DSP 50 sets a moving speed of the object according to a user's setting signal (operation 911). The DSP 50 may set the moving speed by adjusting a shutter speed. For example, when the shutter speed is set to be $1/30$ of a second while the surrounding is bright, the object may move in the image without deviation.

When the setting of the moving direction and the moving speed of the object are completely performed, the DSP 50 applies the object to the image according to the moving direction and the moving speed, and outputs the image on the display unit 80 (operation 913).

Figure 10:
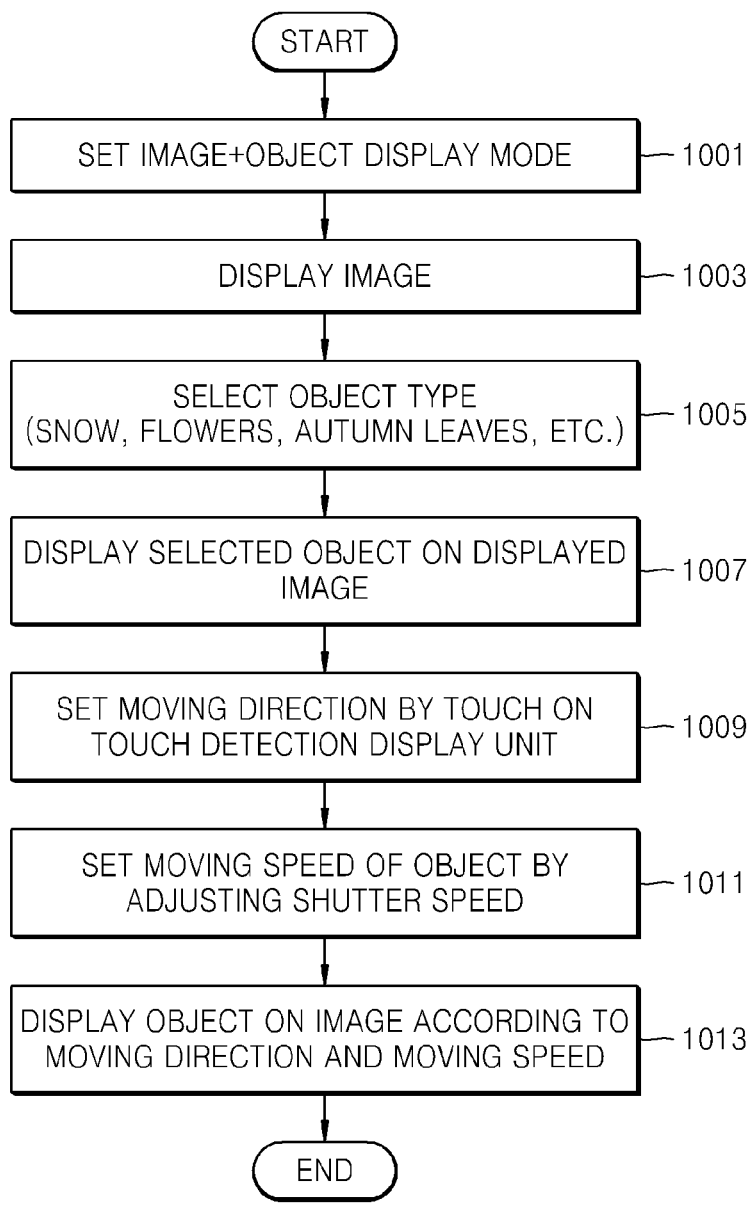
FIG. 10 is a flowchart of a method of realizing a dynamic image effect, according to another embodiment.

A method of realizing a dynamic image effect, according to another embodiment, will be described with reference to FIGS. 1 and 10.

In the method of realizing a dynamic image effect, according to the present embodiment, a moving direction of an object is set by the user's touch of the display unit 80, a moving speed of the object is set by controlling a shutter speed, and the object is displayed together with the image.

The DSP 50 sets an image and object display mode according to a user's selection (operation 1001).

When the image and object display mode are set, the DSP 50 displays an image on the display unit 80 (operation 1003). According to the present embodiment, the image may be a live view image or a reproduction image.

Then, the DSP 50 provides an object to be displayed together with an image, such as snow, flowers and autumn leaves, and receives a selection signal for selecting an object type from a user (operation 1005). Hereinafter, it is assumed that the object selected is snow.

When the object type is selected, the DSP 50 displays the selected object on the image that is being displayed (operation 1007). Initially, the object is set and displayed to have a default moving direction and a default moving speed. When snow is selected as the object, snow that falls randomly is displayed on the image, as shown in FIG. 4A.

The DSP 50 may set the moving direction of the object by detecting the user's touch on the display unit 80 (operation 1009). FIG. 4B shows a case where the user touches the display unit 80 diagonally from top left to bottom right. The DSP 50 detects coordinates of a portion touched by the user. A moving direction of snow is set according to a detection result of the DSP 50. FIG. 4C shows a case where the moving direction of the snow is set to be one direction according to a detection result of the DSP 50. It can be seen in FIG. 4C that the moving direction of snow is changed to a direction in which the user touches the display unit 80, compared to that of FIG. 4A.

When the moving direction of the object is completely set, the DSP 50 sets a moving speed of the object according to a user's setting signal (operation 1011). FIG. 4D shows a case where the shutter speed is longer than $1/30$ of a second so that snow that blows fast is displayed on the image.

When the moving direction and the moving speed of the object are completely performed, the DSP 50 applies the object to the image according to the moving direction and the moving speed, and outputs the image on the display unit 80 (operation 1013). FIGS. 4C and 4D show examples of the image that is finally displayed on the display unit 80.

Figure 11:
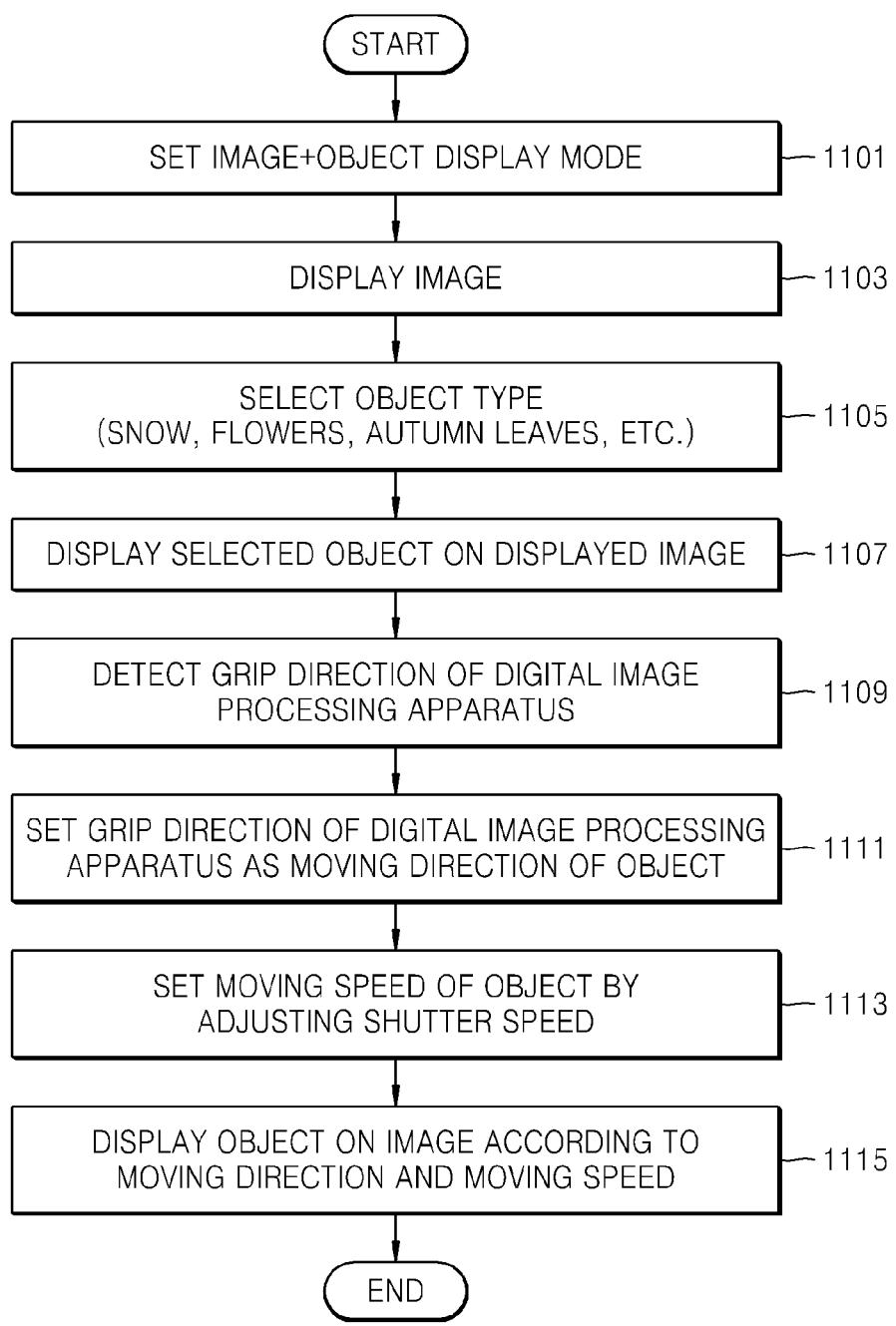
FIG. 11 is a flowchart of a method of realizing a dynamic image effect, according to another embodiment.

A method of realizing a dynamic image effect, according to another embodiment, will be described with reference to FIGS. 1 and 11.

In the method of realizing a dynamic image effect, according to the present embodiment, a moving direction of an object is set according to a grip direction of the digital image processing apparatus 1, a moving speed of the object is set by controlling a shutter speed, and the object is displayed together with the image.

The DSP 50 sets an image and object display mode according to a user's selection (operation 1101).

When the image and object display mode are set, the DSP 50 displays an image on the display unit 80 (operation 1103). According to the present embodiment, the image may be a live view image or a reproduction image. Then, the DSP 50 provides an object to be displayed together with an image, such as snow, flowers and autumn leaves, and receives a selection signal for selecting an object type from a user (operation 1105). Hereinafter, it is assumed that the object selected is snow.

When the object type is selected, the DSP 50 displays the selected object on the image that is being displayed (operation 1107). Initially, the object is set and displayed to have a default moving direction and a default moving speed. When snow is selected as the object, snow that falls randomly is displayed on the image, as shown in 6A.

The DSP 50 detects the grip direction of the digital image processing apparatus 1 by using the gyro sensor 52-2 or a gravity sensor (not shown) (operation 1109). When a user holds the digital image processing apparatus 1, the gyro sensor 52-2 or the gravity sensor detects a rotation angle of the digital image processing apparatus 1. In order for the gyro sensor 52-2 and the gravity sensor to detect the rotation angle of the digital image processing apparatus 1, a reference angle (e.g.,0°) is stored in the DSP 50. FIG. 6B shows a rotation angle θ of the digital image processing apparatus 1. The gyro sensor 52-2 or the gravity sensor detects the rotation angle θ of the digital image processing apparatus 1. The grip direction of the digital image processing apparatus 1 may be detected by the rotation angle θ of the digital image processing apparatus 1, which is detected by the gyro sensor 52-2 or the gravity sensor.

The DSP 50 sets the grip direction of the digital image processing apparatus 1 as a moving direction of the object (operation 1111). FIG. 6C shows a case where the gyro sensor 52-2 detects the rotation angle θ of digital image processing apparatus 1 so as to set the moving direction of snow to one direction. It can be seen in FIG. 6C that the moving direction of snow is changed to a grip direction at the rotation angle θ with respect to the reference angle, compared to that of FIG. 6A.

When the moving direction of the object is completely set, the DSP 50 sets a moving speed of the object according to a user's setting signal (operation 1113). FIG. 6D shows a case where the shutter speed is longer than 1/30 of a second so that snow blows fast in the image.

When the setting of the moving direction and the moving speed of the object are completely performed, the DSP 50 applies the object to the image according to the moving direction and the moving speed, and outputs the image on the display unit 80 (operation 1115). FIGS. 6C and 6D show examples of the image that is finally displayed on the display unit 80.

Figure 12:
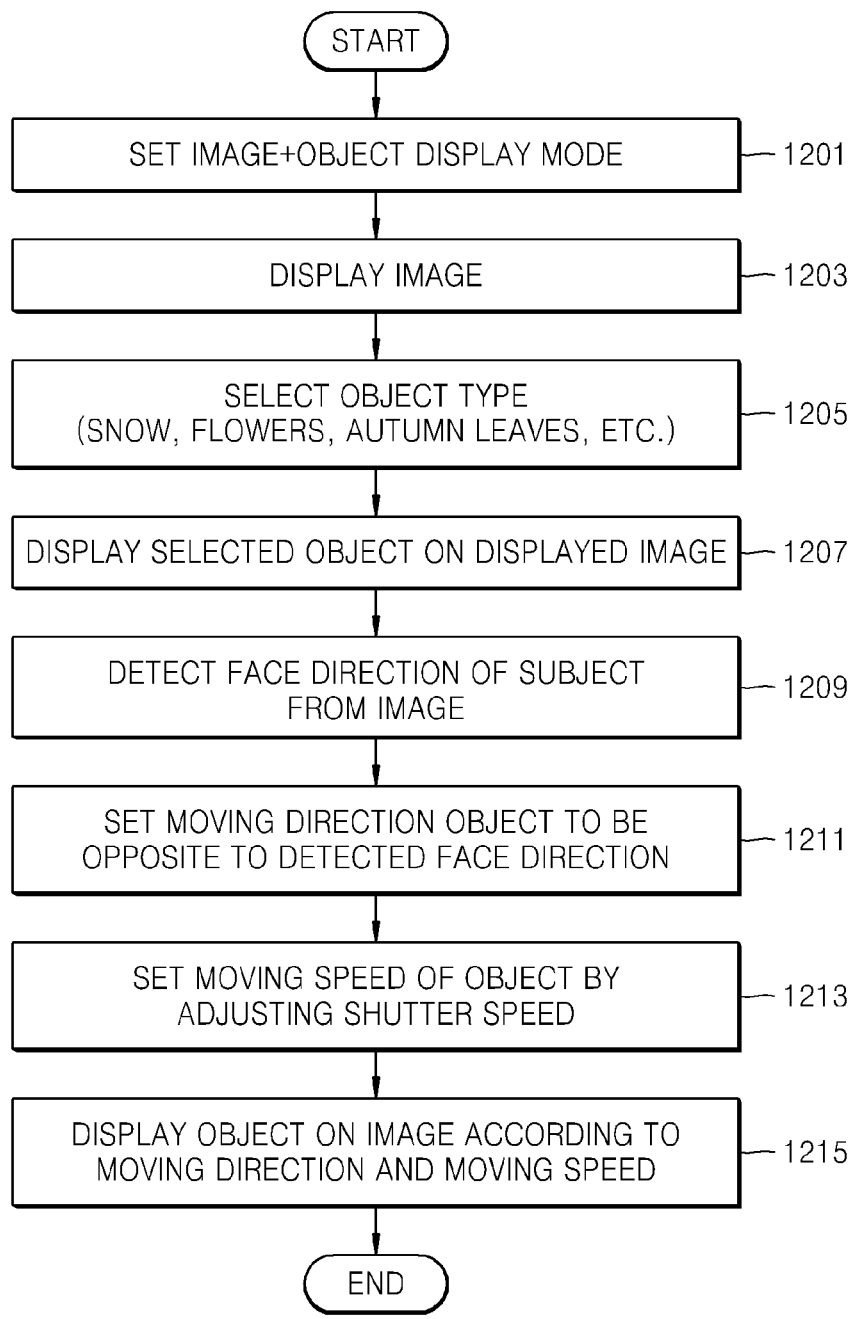
FIG. 12 is a flowchart of a method of realizing a dynamic image effect, according to another embodiment.
Figure 13:
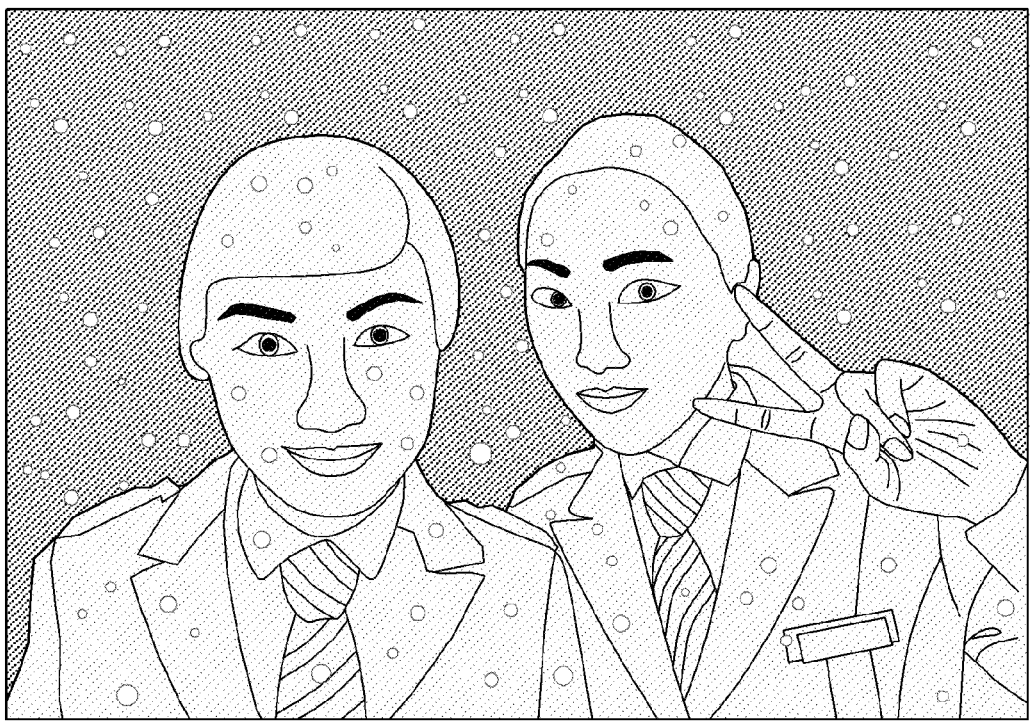
FIG. 13 is a photographic image of a conventional method of realizing a dynamic image effect.

A method of realizing a dynamic image effect, according to the present embodiment, will be described with reference to FIGS. 1 and 12.

In the method of realizing a dynamic image effect, according to the present embodiment, a moving direction of an object displayed together with the image is set to be an opposite direction of a face direction, a moving speed of the object is set by controlling a shutter speed, and the object is displayed together with the image.

The DSP 50 sets an image and object display mode according to a user's selection (operation 1201).

When the image and object display mode are set, the DSP 50 displays an image on the display unit 80 (operation 1203). According to the present embodiment, the image may be a live view image or a reproduction image.

Then, the DSP 50 provides an object to be displayed together with an image, such as snow, flowers and autumn leaves, and receives a selection signal for selecting an object type from a user (operation 1205). Hereinafter, it is assumed that the object selected is snow.

When the object type is selected, the DSP 50 displays the selected object on the image that is being displayed (operation 1207). Initially, the object is set and displayed to have a default moving direction and a default moving speed. When snow is selected as the object, snow that falls randomly is displayed on the image, as shown in FIG. 8A.

The DSP 50 detects a face direction of a subject from the image (operation 1209). For example, the face direction may be detected by comparing a face detected from the image with learned data regarding the face direction. Many methods of detecting a face and a face direction are well known in the art, and thus the methods will not be described. FIG. 8A shows a case where the face direction is detected from the image.

Then, the DSP 50 sets the moving direction of the object to be opposite to the face direction (operation 1211). FIG. 8B shows a case where snow moves in an opposite direction to the detected face direction.

When the moving direction of the object is completely set, the DSP 50 sets a moving speed of the object according to a user's setting signal (operation 1213). FIG. 8C shows a case where the shutter speed is longer than 1/30 of a second so that snow that blows fast is displayed on the image.

When the moving direction and the moving speed of the object are completely set, the DSP 50 applies the object to the image according to the moving direction and the moving speed, and outputs the image to the display unit 80 (operation 1215). FIGS. 8B and 8C show examples of the image that is finally displayed on the display unit 80.

As described above, a user can have lots of fun by freely setting a moving direction and speed of an object (e.g., snow, flowers and autumn leaves) and then displaying the object together with an image.

A program for executing methods of realizing a dynamic image effect according to the present embodiments and embodiments modified thereof may be stored in a non-transitory computer readable storage medium. Here, the storage medium may be read using the CPU 100 or DSP 50 as shown in FIG. 1, for example. Any processes may be implemented as software modules or algorithms, and may be stored as program instructions or computer readable codes executable on a processor on a non-transitory computer-readable storage media such as flash memory, read-only memory (ROM), random-access memory (RAM), CD-ROM's, DVD's, magnetic tapes, floppy disks, hard disks, and optical data storage devices. The computer readable storage medium can also be distributed over network coupled computer systems so that the computer readable code is stored and executed in a distributed fashion. This computer readable code can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

While the invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for realizing a dynamic image effect, comprising:
    a digital image processing apparatus including
        a digital signal processor (DSP) that adjusts a moving direction and a moving speed of a predetermined object displayed together with an image, wherein the DSP comprises:
        an object type setting unit that provides an object type and sets the predetermined object;
        a direction setting unit that sets a direction of the predetermined object;
        a speed setting unit that sets a speed of the predetermined object by adjusting a shutter speed of the digital image processing apparatus; and
        a controller that displays the predetermined object together with an image according to the direction and the speed.

2. The apparatus of claim 1, wherein the direction setting unit detects a touch on a display unit on which the image is displayed.

3. The apparatus of claim 1, wherein the direction setting unit comprises a sensor that detects a grip direction of the digital image processing apparatus, and
    wherein the direction setting unit detects the grip direction of the digital image processing apparatus by using the sensor.

4. The apparatus of claim 1, further comprising a face detector that detects a face direction from the image, and
    wherein the direction setting unit sets the direction of the predetermined object to be opposite to the face direction.

5. An apparatus for realizing a dynamic image effect, comprising a digital image processing apparatus including a digital signal processor (DSP) that adjusts a moving direction and a moving speed of a predetermined object displayed together with an image, wherein the DSP comprises:
    an object setting unit that provides at least one object to be displayed together with an image and sets a predetermined object from among the at least one object;
    a touch detector that detects a touch on a display unit on which the image is displayed;
    a shutter speed setting unit that sets a shutter speed of the digital image processing apparatus; and
    a controller that calculates a direction of the predetermined object according to the detected touch, calculates a moving speed of the predetermined object according to the shutter speed, and displays the predetermined object together with the image.

6. An apparatus for realizing a dynamic image effect, comprising a digital image processing apparatus including a digital signal processor (DSP) that adjusts a moving direction and a moving speed of a predetermined object displayed together with an image, wherein the DSP comprises:
- an object setting unit that provides at least one object to be displayed together with an image and sets a predetermined object from among the at least one object;
- a sensor that detects a grip direction of the digital image processing apparatus;
- a shutter speed setting unit that sets a shutter speed of the digital image processing apparatus; and
- a controller that calculates a direction of the predetermined object according to the detection result of the sensor, calculates a moving speed of the predetermined object according to the shutter speed, and displays the predetermined object together with the image.

7. An apparatus for realizing a dynamic image effect, comprising a digital image processing apparatus including a digital signal processor (DSP) that adjusts a moving direction and a moving speed of a predetermined object displayed together with an image, wherein the DSP comprises:
- an object setting unit that provides at least one object to be displayed together with an image and sets a predetermined object from among the at least one object;
- a face detector that detects a face direction of a subject from an image;
- a shutter speed setting unit that sets a shutter speed of the digital image processing apparatus; and
- a controller that calculates a direction of the predetermined object so as to be opposite to the face direction, calculates a moving speed of the predetermined object according to the shutter speed, and displays the predetermined object together with the image.

8. A method of realizing a dynamic image effect, the method comprising:
- operating a digital image processing apparatus;
- providing at least one object to be displayed together with an image and receiving a signal for selecting a predetermined object from among the at least one object;
- setting a direction of the predetermined object;
- setting a speed of the predetermined object according to a shutter speed of the digital image processing apparatus; and
- displaying the predetermined object together with the image according to the direction and speed.

9. The method of claim 8, wherein the setting of the direction includes detecting a touch on a display unit on which the image is displayed.

10. The method of claim 8, wherein the setting of the direction includes detecting a grip direction of the digital image processing apparatus.

11. The method of claim 8, wherein the setting of the direction includes setting the direction to be opposite to a face direction detected from the image.

12. The method of claim 8, further comprising:
- detecting a touch on a display unit on which the image is displayed; and
- calculating a direction of the predetermined object according to the detected touch, calculating a moving speed of the predetermined object according to the shutter speed, and displaying the predetermined object together with the image.

13. The method of claim 8, further comprising:
- detecting a grip direction of the digital image processing apparatus, wherein the detecting is performed by a sensor; and
- calculating a direction of the predetermined object according to the detection result of the sensor, calculating a moving speed of the predetermined object according to the shutter speed, and displaying the predetermined object together with the image.

14. The method of claim 8, further comprising:
- detecting a face direction of a subject from the image; and
- calculating a direction of the predetermined object so as to be opposite to the face direction, calculating a moving speed of the predetermined object according to the shutter speed, and displaying the predetermined object together with the image.

* * * * *